United States Patent [19]

Numata et al.

[11] 4,037,236
[45] July 19, 1977

[54] SWITCHING CIRCUIT FOR ELECTRIC SHUTTER

[75] Inventors: Saburo Numata; Shinichiro Fujino, both of Urawa, Japan

[73] Assignee: Fuji Photo Optical Co., Ltd., Omiya, Japan

[21] Appl. No.: 630,432

[22] Filed: Nov. 10, 1975

[30] Foreign Application Priority Data

Nov. 8, 1974    Japan ................................ 49-128766

[51] Int. Cl.² ............................................ G03B 7/08
[52] U.S. Cl. .................... 354/51; 354/60 R; 354/258
[58] Field of Search ............. 354/50, 51, 60 R, 234.5, 354/258

[56]         References Cited

FOREIGN PATENT DOCUMENTS

2,308,108   7/1974   Germany ............................. 354/51

Primary Examiner—L. T. Hix
Assistant Examiner—J. A. LaBarre

[57]                  ABSTRACT

In an electric shutter including a light measuring circuit for measuring the scene brightness and a comparator connected therewith for providing output voltage which rises from a low level to a high level when a time corresponding to the scene brightness has lapsed, a switching transistor circuit and an electromagnet for holding the trailing shutter blind are connected in parallel between the output of the comparator and the main power switch. When the power switch is turned on, both the switching transistor circuit and the electromagnet are turned on. When the output voltage of the comparator rises up to the high level, the switching transistor circuit and the electromagnet are turned off.

1 Claim, 1 Drawing Figure

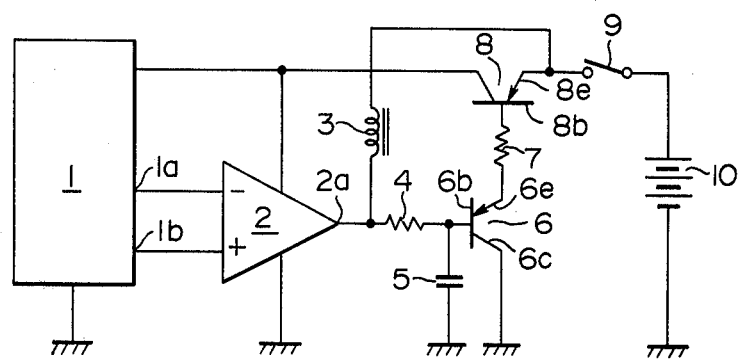

SWITCHING CIRCUIT FOR ELECTRIC SHUTTER

BACKGROUND OF THE INVENTION

1. Field of the Invention

This invention relates to a switching circuit for an electric shutter in a photographic camera, and more particularly to a switching circuit for switching the supply of power to a shutter speed control circuit of an electric shutter in a camera.

2. Description of the Prior Art

In the conventional electric shutter are employed a plurality of mechanical switches provided between the power source and the shutter speed control circuit. Since in the switch means of mechanical type comprising a plurality of switches a power switch is first turned on when the main switch is turned on upon depression of a shutter release button and last turned off when the shutter release is completed. Therefore, the electric shutter employing this kind of switching means has a defect in that when some switches are turned off, electric charges move between capacitors and various circuit elements equivalent to capacitors such as diodes, PN-junction portions of transistors, operational amplifiers and so forth until the power switch is turned off last. In case that the charges move to a capacitor in a light measuring circuit and the input current of the light measuring circuit is small due to low brightness for instance, the response speed of the shutter speed control circuit is substantially lowered by the charge stored in the capacitor. Further, since the power switch is turned off last, the electric power is wasted until the power switch is turned off after the completion of shutter release.

SUMMARY OF THE INVENTION

In view of the above described defects inherent in the conventional electric shutter in a photographic camera, the primary object of the present invention is to provide a switching circuit for an electric shutter in a photographic camera in which the power supply switching means is turned off with the completion of the shutter release operation to prevent the movement of charges between capacitors after the start of the trailing shutter blind.

In accordance with the present invention there is provided a switching circuit for an electric shutter in a photographic camera which is turned on to electrically connect a power source to a shutter speed control circuit upon closure of a main power switch and turned off to electrically separate the power source from the shutter control circuit upon turning off an electromagnet for holding the trailing shutter blind before the main power switch is mechanically opened. Since the switching circuit is turned off with the turning off of the electromagnet which serves to hold the trailing shutter blind, i.e. upon completion of shutter release, control there does not occur movement of charges between capacitors in the exposure control circuit after the completion of the shutter release, and accordingly, the response speed of the shutter speed control circuit is not lowered. In addition, since the switching circuit is turned off with the turning off of the electromagnet, electric power is not wasted at all after the completion of the shutter release.

The switching circuit in accordance with the present invention comprises a switching transistor connected between a main power switch and the output of an operational amplifier connected with a light measuring circuit including a time constant circuit. The switching transistor is further connected with an electromagnet for holding the trailing shutter blind so that the switching transistor and the electromagnet may be turned off substantially simultaneously.

BRIEF DESCRIPTION OF THE DRAWING

The single FIGURE is a circuit diagram showing the switching circuit employed in an electric shutter in accordance with an embodiment of the present invention.

DESCRIPTION OF THE PREFERRED EMBODIMENT

Referring to the single figure which shows an example of an electric shutter adapted to be incorporated in a single lens reflex camera wherein the switching circuit in accordance with an embodiment of the present invention is employed, a light measuring circuit 1 including a photodetector (not shown) to measure the scene brightness is connected with a power source 10 by way of a switching transistor 8 and a main power switch 9. The main power switch 9 is closed upon depression of a shutter release button (not shown) and held in its closed position by a member in a shutter release mechanism or a member connected therewith such as a swing-up mirror in a camera body so that it is held in its closed position until the member is returned to its original position. The light measuring circuit 1 has two output terminals 1a and 1b, one 1a being to provide a reference voltage and the other 1b being to provide an output voltage which rises at the rate corresponding to the scene brightness. The output voltage is supplied from the output terminal 1b upon the start of the leading shutter blind. The output voltage rises at a great rate when the scene brightness is high and at a small rate when it is low. Since the light measuring circuit which provides such an output voltage is well known in the art, the detailed description of the same is omitted here. A comparator 2 is connected with the two output terminals 1a and 1b, with the inversion input terminal (-) connected with the output terminal 1a for giving a reference voltage and the non-inversion input terminal (+) connected with the other terminal 1b for supplying the output voltage. The output terminal 2a of the comparator 2 is connected with the emitter 8e of said switching transistor 8 by way of an electromagnet 3 which holds the trailing shutter blind in the camera. The light measuring circuit 1 and the comparator 2 constitute a shutter speed control circuit. The output terminal 2a of the comparator 2 is further connected with a transistor 6 by way of a base resistor 4 connected with the base 6b thereof. A bypass capacitor 5 is connected between the base 6b and the ground or the collector 6c of the transistor 6. The emitter 6e of the transistor 6 is connected with the base 8b of said switching transistor 8 by way of a base resistor 7. The two transistors 6 and 8 constitute a switching means which serves to electrically connect the power source 10 to the light measuring circuit 1 and disconnect the same therefrom.

In operation of the above described circuit, the power switch 9 is closed upon the first stage of depression of the shutter release button (not shown), and simultaneously therewith transistors 6 and 8 are turned on to supply the power to the light measuring circuit 1. The light measuring circuit 1 provides a reference voltage of a predetermined constant level at the first output terminal 1a and an output voltage of zero level at the second output terminal 1b. Accordingly, the output of the comparator 2 at the output terminal 2a becomes low level, which results in turning on of the electromagnet 3 to make it hold the trailing shutter blind. Then, at the second stage of depression of the shutter release button, the leading shutter blind (not shown) is released by means of a shutter release mechanism (not shown) well known in the art, and the output voltage at the second output voltage at the second terminal 1b of the light measuring circuit 1 rises at a rate corresponding to the scene brightness. When the level of the output voltage becomes equal to the level of the reference voltage, the output of the comparator 2 becomes high level, which results in turning off of the electromagnet 3 to make it release the trailing shutter blind. With the turning off of the electromagnet 3, the transistor 6 is turned off since the base voltage thereof becomes high. Accordingly, the switching transistor 8 is also turned off simultaneously therewith and the supply of the power to the light measuring circuit 1 is stopped.

We claim:

1. In a photographic camera including an automatic shutter speed control means comprising a power source, a power switch connected therewith which is closed upon depression of a shutter release button and held in its closed position until the shutter release is completed, a shutter speed control circuit which measures the scene brightness and provides an output voltage which rises up at a rate corresponding to the scene brightness measured thereby, and an electromagnet for holding a trailing shutter blind connected between said power switch and the output of said shutter speed control circuit, said electromagnet being energized while the output voltage of said shutter speed control circuit is below a predetermined level and deenergized when the output reaches the predetermined level, whereby the shutter speed is controlled by the rate at which the output voltage, rises, a switching circuit connected between said power switch and said shutter speed control circuit for electrically connecting the power switch to the circuit when turned on, said switching circuit being turned on when said power switch is closed and when the output of said shutter speed control means is below said predetermined level and turned off when said power switch is opened or when power switch is closed and the output of said shutter speed control circuit is not lower than said predetermined level, whereby the switching circuit is turned off upon deenergization of said electromagnet, said switching circuit comprising a first transistor, the emitter thereof being connected with the power switch, the collector thereof being connected with said shutter speed control circuit for supplying power to the latter when turned on, and a second transistor, the emitter thereof being connected with the base of said first transistor, the collector thereof being grounded, the base thereof being grounded by way of a capacitor and connected with the output of said shutter speed control circuit.

* * * * *

UNITED STATES PATENT AND TRADEMARK OFFICE
CERTIFICATE OF CORRECTION

PATENT NO. : 4,037,236
DATED : July 19, 1977
INVENTOR(S) : SABURO NUMATA et al

It is certified that error appears in the above-identified patent and that said Letters Patent are hereby corrected as shown below:

Column 4, line 9, delete "," (first Occurrence);

line 16, insert "said" after --when--.

Signed and Sealed this

Tenth Day of January 1978

[SEAL]

Attest:

RUTH C. MASON
Attesting Officer

LUTRELLE F. PARKER
Acting Commissioner of Patents and Trademarks